US009625595B2

(12) United States Patent
Larsen et al.

(10) Patent No.: US 9,625,595 B2
(45) Date of Patent: Apr. 18, 2017

(54) INTERPRETATION AND FEATURE DETECTION IN A SEISMIC VOLUME USING BUMP MAPPING AND LIGHTING

(71) Applicant: Schlumberger Technology Corporation, Sugar Land, TX (US)

(72) Inventors: Christian Westlye Larsen, Sandnes (NO); Jimmy Klinger, Stavanger (NO); Amadeus Wieczorek, Mississauga (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 469 days.

(21) Appl. No.: 13/732,346

(22) Filed: Dec. 31, 2012

(65) Prior Publication Data
US 2013/0235696 A1 Sep. 12, 2013

Related U.S. Application Data

(60) Provisional application No. 61/607,425, filed on Mar. 6, 2012, provisional application No. 61/716,252, filed on Oct. 19, 2012.

(51) Int. Cl.
*G01V 1/34* (2006.01)
(52) U.S. Cl.
CPC ..................... *G01V 1/34* (2013.01)
(58) Field of Classification Search
CPC .............................. G01V 1/28; G01V 2210/65
See application file for complete search history.

(56) References Cited

U.S. PATENT DOCUMENTS

| 5,555,531 A * | 9/1996 | Booth ...................... G01V 1/28 367/15 |
| 2011/0002194 A1 | 1/2011 | Imhof et al. |
| 2012/0254781 A1 | 10/2012 | Larsen et al. |
| 2013/0223187 A1* | 8/2013 | Thapar et al. .................. 367/73 |

FOREIGN PATENT DOCUMENTS

EP 228231 A2 7/1987

OTHER PUBLICATIONS

H. W. Posamentier et al "Seismic geomorphology—an overview" Geological Society London, published 2007 pp. 1-14.*
Davies, et al., "Geologic processes in sedimentary basins inferred from three-dimensional seismic imaging", GSA Today, vol. 15 (10), 2005, pp. 4-9.
Posamentier, et al., "Seismic geomorphology—an overview", Seismic Geomorphology: Applications to Hydrocarbon Exploration and Production, vol. 277, 2007, pp. 1-14.
Examination Report issued in related GB application 1304011.8 on Nov. 20, 2015, 3 pages.
Combined Search and Examination Report issued in related GB Application No. 1304011.8 mailed Aug. 19, 2013 (7 pages).

* cited by examiner

*Primary Examiner* — Luke Ratcliffe
(74) *Attorney, Agent, or Firm* — Alec McGinn; Colin Wier

(57) ABSTRACT

Example embodiments of the present disclosure include one or more of a method, computing device, computer-readable medium, and system for creating a heightmap based on at least a portion of seismic data, rendering the heightmap, and illuminating at least a portion of the rendered heightmap.

20 Claims, 4 Drawing Sheets

INTERPRETATION AND FEATURE DETECTION IN A SEISMIC VOLUME USING BUMP MAPPING AND LIGHTING

CROSS-REFERENCE TO RELATED APPLICATION

This application claims the benefit of (a) U.S. Provisional Patent Application 61/607,425 filed Mar. 6, 2012 entitled "Interpretation and Feature Detection in a Seismic Volume Using a Directional Light Tool"; and (b) U.S. Provisional Patent Application 61/716,252 filed Oct. 19, 2012 entitled "Interpretation and Feature Detection in a Seismic Volume Using a Directional Light Tool," the contents of (a) and (b) are hereby incorporated in their entirety.

BACKGROUND

Lighting tools may be present in certain software (e.g., seismic interpretation software, or any software that relates to the seismic to production process that involves visualizing surfaces). For example, certain seismic interpretation software may include functionality to enable a user to control lighting effects with respect to an illuminated object. Lighting tools may be used to highlight topography in various ways and/or allocate colors based on the orientation of the structures in order to facilitate the interpretation and understanding of deformations and/or depositional processes.

SUMMARY

An example embodiment of the present disclosure may include a method, system, and/or software for creating a heightmap based on at least a portion of seismic data (as an example, a portion of the seismic data may be a first portion that is a lower resolution than a second portion of the seismic data); rendering the heightmap; and illuminating at least a portion of the rendered heightmap. Illuminating at least a portion of the rendered heightmap may include directing a colored light at the portion of the rendered heightmap. The colored light may include a plurality of colored lights, wherein at least two of the colored lights are of different colors.

Creating the heightmap may include determining at least one of an occlusion and a parallax effect. In an example embodiment, creating the heightmap may include creating a mesh over at least one of an intersection or surface represented by the seismic data; and adjusting a position of at least one vertex according to a value in the computed heightmap. Creating the heightmap may include considering at least one of the direction of the light and a viewing perspective. An example method may also include filtering values in the heightmap that are not within a specified color interval.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Implementations of various technologies will hereafter be described with reference to the accompanying drawings. It should be understood, however, that the accompanying drawings illustrate the various implementations described herein and are not meant to limit the scope of various technologies described herein.

DETAILED DESCRIPTION

Figure 1:
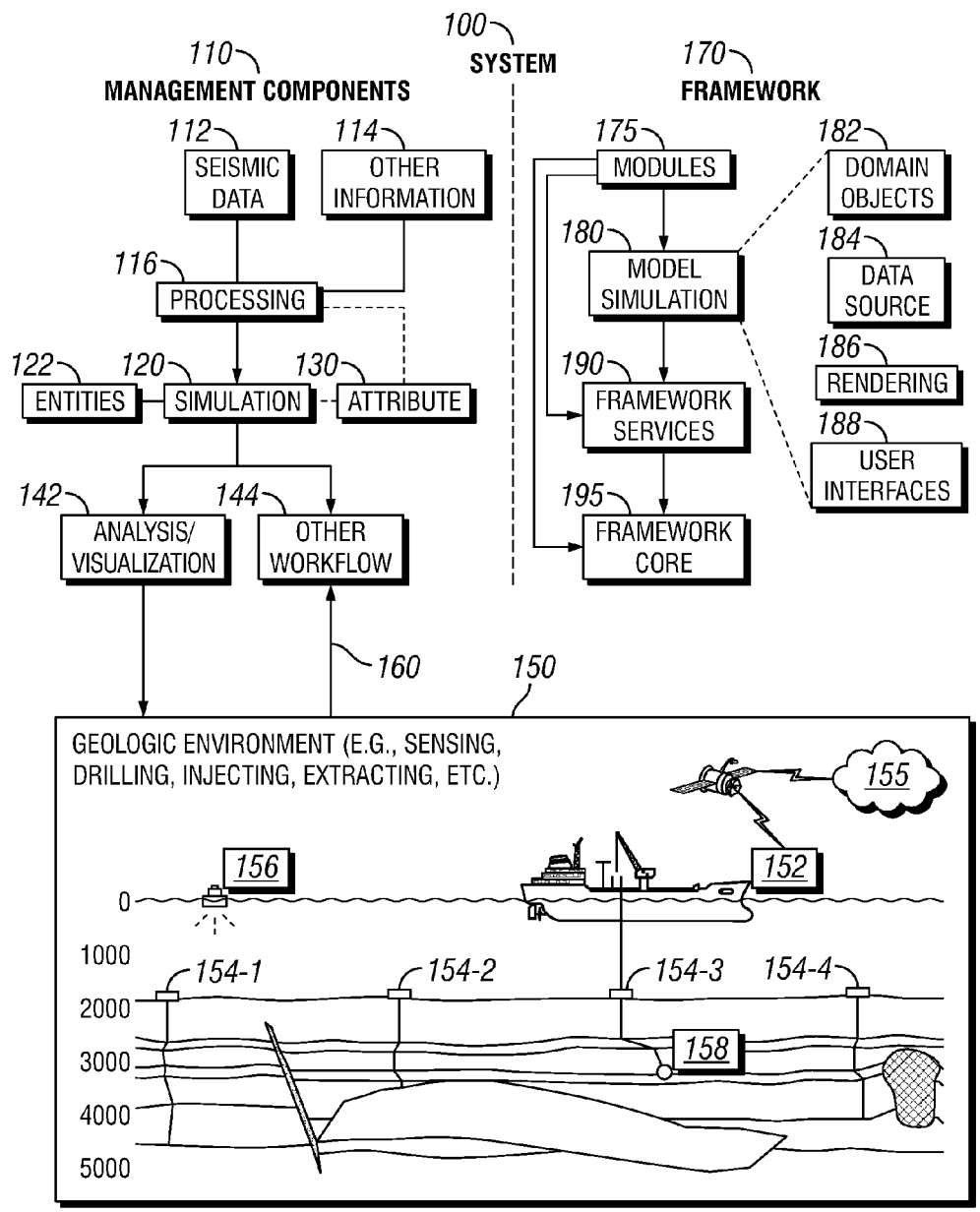
FIG. 1 illustrates an example system that includes various components for simulating a geologic environment.

FIG. 1 shows an example of a system 100 that includes various management components 110 to manage various aspects of a geologic environment 150 (e.g., an environment that includes a sedimentary basin) as well as an example of a framework 170. In the example of FIG. 1, the components may be or include one or more modules. As to the management components 110, one or more of these components may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, geobodies, etc. In the system 100, the entities 122 can include virtual representations of actual physical entities that are reconstructed for purposes of simulation. The entities 122 may include entities based on data acquired via sensing, observation, interpretation, etc. (e.g., the seismic data 112 and other information 114).

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data, geobody classes may define objects for representing geobodies based on seismic data, etc. As an example, an interpretation process that includes generation of one or more seismic attributes may provide for definition of a geobody using one or more classes. Such a process may occur via interaction (e.g., user interaction), semi-automatically or automatically (e.g., via a feature extraction process based at least in part on one or more seismic attributes).

In the example of FIG. 1, the simulation component 120 may process information to conform to one or more attributes specified by the attribute component 130, which may include a library of attributes. Such processing may occur prior to input to the simulation component 120. Alternatively, or in addition, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results, attributes, etc. In an example embodiment, output from the simulation component 120, the attribute component 130 or one or more other components may be input to one or more other workflows, as indicated by a workflow component 144 (e.g., for triggering another process).

In an example embodiment, the management components 110 may include features of a commercially available simulation framework such as the PETREL® seismic to simulation software framework. The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components (e.g., or modules) may be implemented as add-ons (or plug-ins) that conform to and operate according to specifications of a framework environment (e.g., according to application programming interface (API) specifications, etc.).

FIG. 1 also shows, as an example, the framework 170, which includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids (e.g., that represent a geologic environment).

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, geobodies, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 158, which may be equipment to drill, acquire information, assist with resource recovery, etc. Other equipment 156 may be located remote from a well site and include sensing, detecting, emitting or other circuitry. Such equipment may include storage and communication circuitry to store and to communicate data, instructions, etc. The geologic environment 150 also shows various wells (e.g., wellbores) 154-1, 154-2, 154-3 and 154-4. In the example of FIG. 1, the downhole equipment 158 may include a drill for drilling the well 154-3.

The framework 170 may provide for modeling the geologic environment 150 including the wells 154-1, 154-2, 154-3 and 154-4 as well as stratigraphic layers, lithologies, faults, etc. The framework 170 may create a model with one or more grids, for example, defined by nodes, where a numerical technique can be applied to relevant equations discretized according to at least one of the one or more grids. As an example, the framework 170 may provide for performing a simulation of phenomena associated with the geologic environment 150 using at least a portion of a grid. As to performing a simulation, such a simulation may include interpolating geological rock types, interpolating petrophysical properties, simulating fluid flow, or other calculating (e.g., or a combination of any of the foregoing).

Figure 2:
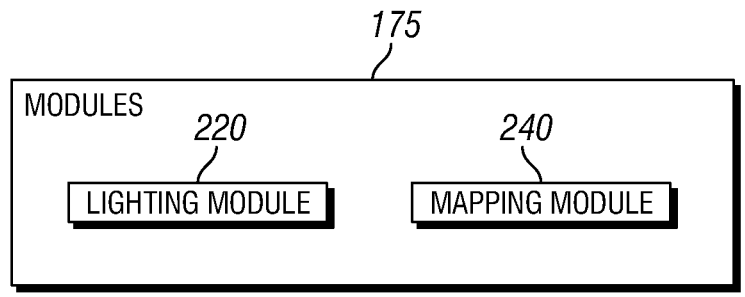
FIG. 2 illustrates an example lighting module and mapping module according to an embodiment of the present disclosure.

According to an example embodiment, a system 100 may enable interaction and certain other functionality, including, without limitation, interaction with seismic data. FIG. 2 shows an example embodiment of modules layer 175

(shown in FIG. 1) that includes an example heightmap module 220 and an example lighting module 240. The heightmap module 220 and lighting module 240 may be used to implement one or more embodiments described herein.

An example embodiment of the present disclosure includes a method of generating reflections based on a heightmap (e.g., an artificial heightmap) that is produced from at least a portion of visualized seismic data (e.g., flat 2D sections or a naturally bumped section, such as where you are using a re-projected seismic section). The magnitude of the heightmap may be scaled with respect to the absolute amplitude value of a sample within a seismic data.

Example embodiments of a light control are described in U.S. patent application Ser. No. 13/431,001, the contents of which are hereby incorporated in their entirety. U.S. patent application Ser. No. 13/431,001 describes an example light control user interface (UI) component that can be used to modify one or more characteristics of a light with respect to visualized geology and/or geophysics ("G&G") data. Visualized G&G data may include 2D or 3D scene, including, without limitation, a seismic visualization scene. For example a light control may be used to rotate one or more lights and/or modify a color of one or more lights. In addition, the light control may be used to animate one or more lights in a seismic scene. In an example embodiment of a light control, one or more user interface elements representing one or more lights may be located on an ellipse representing a plurality of azimuths, thereby allowing a user to define a position and/or direction of a light. This can enable a user to interactively manipulate azimuth and elevation of a light.

Figure 3:
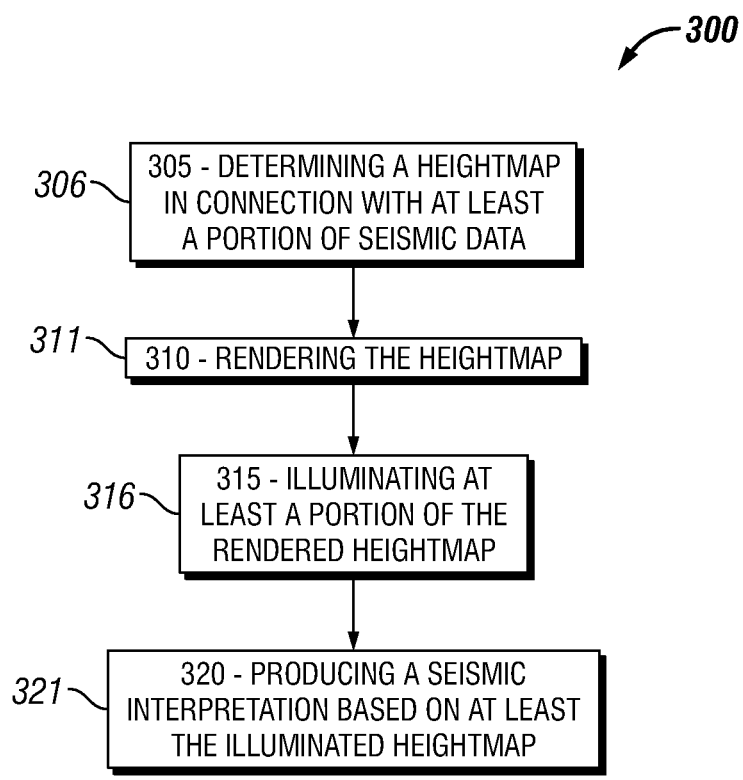
FIG. 3 illustrates an example method of using a heightfield and one or more lights to create a seismic interpretation according to an embodiment of the present disclosure.

FIG. 3 shows an example method 300 for combining lighting tool capabilities and bump mapping to assist a user with interpreting seismic data. FIG. 3 also shows associated computer instructions 306, 311, 316, and 321 that may be executed by a processor. Method 300 may include a block 305 that involves determining a heightmap in connection with at least a portion of seismic data. Block 310 may include rendering the heightmap. At block 315, a user may illuminate at least a portion of the rendered heightmap (e.g., illuminating at least a portion of the rendered heightmap with one or more lights using a light control UI component such as the one described in U.S. patent application Ser. No. 13/431,001). Block 315 may include performing one or more iterations of setting the angle of one or more lights. In an example embodiment, lights may be set at equal azimuth distances. For example a first light may be set at an azimuth of approximately 0 degrees, a second light may be set at an azimuth of approximately 180 degrees, and a third light may be set at an azimuth of approximately 240 degrees, etc.). In another example embodiment, a user may iterate on the elevation and/or dip of one or more lights. For example, the user might define whether a light is pointing up or down. Block 320 may include producing a seismic interpretation based at least on the illuminated heightmap.

According to an example embodiment, a bump mapping algorithm may take one or more of the following as inputs:

(1) A heightmap (e.g., an artificial heightmap calculated from at least a portion of a seismic slice);

(2) A surface (e.g., an object that is derived from seismic or any other information, such as well information)

The heightmap and the surface can be used to compute a new normal. In some embodiments, input may include a surface when a bump mapping algorithm is configured to have a heightmap "follow" another surface (in other embodiments, a surface might not be used). A bump mapping algorithm might be configured to have a heightmap follow another surface if the heightmap is not computed based upon visualized data. As an example, the heightmap might not be computed from the original seismic data/visualized plane (e.g., the heightmap might be determined by investigating the amplitudes in the data and setting the height to be proportional to the amplitude). Rather, the heightmap might be based on some other surface or data derived from the original seismic (e.g., a seismic attribute intersection, whose height map was computed). Accordingly, the height map might not be computed from what is visualized. This could also apply to displacement mapping, where displacements may be computed based on something other than what is visualized. An example embodiment may involve a "blended" heightmap using seismic volumes that can be artificially bumped on top of the same intersection. Light may then be applied to the blended heightmap.

A computed normal vector can be passed on to a lighting model, including, without limitation a lighting model that uses Phong and/or Goraud shading (other lighting models may also be used). The resulting illuminated heightmap may depend on the interaction between the heightmap and one or more lights in a scene. The foregoing may be used to render a bump-mapped seismic surface that is illuminated by one or more lights.

With parallax mapping, in addition to considering a heightmap and a surface, an example bump mapping algorithm can use one or more of the following as inputs:

(3) one or more lights (e.g. considering a direction of a light in a scene)

(4) viewing direction (e.g., camera viewpoint)

An example embodiment of displacement mapping could use one or more of the following as input: a heightmap, a surface, one or more lights, and/or viewing direction.

In summary, an example bump mapping algorithm according to the present disclosure can use one or more of parallax mapping and/or displacement mapping, and therefore can use one or more of the following as input: a heightmap, a surface, one or more lights, and/or viewing direction.

An example embodiment of the present disclosure may be used to cause a plane to appear bumpy by applying bump-mapping or parallax mapping to the plane (e.g., apply bump-mapping or parallax mapping to a plane using one or more of the following as inputs: heightmap, the surface, one or more lights, and/or viewing direction). Furthermore, an example embodiment of the present disclosure may be used to illuminate a surface that already appears bumpy. In certain cases, where the surface already appears bumpy, bump mapping might not be applied. However, the light control can enable a user to illuminate a surface from various angles.

Some example bump mapping techniques might not take into account occlusion or parallax effects. However, another example bump mapping algorithm may include steep parallax mapping. Added occlusion and parallax effects can improve a user's ability to see certain data displacements with respect to rendered seismic data (e.g., when viewed at an angle). On certain graphical processing units (GPUs), parallax mapping can be at least as efficient as bump mapping.

Displacement mapping can include creating a finer mesh (e.g., a triangular mesh) over an intersection or surface and adjusting the position of one or more vertices according to values in a computed bump map. As an example, small increments (e.g., increments below the seismic resolution) might be used to reduce distortion of the position of the data.

Illumination of a seismic section that has been rendered with a bump mapping algorithm can generate visualized seismic data that can allow a user to obtain a better understanding of seismic data without computing a seismic attribute. That is, an example embodiment of the present disclosure might not involve a-priori interpretation of seismic data and/or seismic attribute computation.

An example embodiment may use a GPU shader that is configured to filter out one or more color values v (e.g., all color values) that are not within a predetermined color interval (e.g., v+/−e). Accordingly, the identification of faults, horizons and/or structures represented by seismic data can be done using one or more GPU shaders. This enables a user to perform a seismic interpretation task without calculating a seismic attribute related to at least a portion of the seismic data. Since graphics hardware can accelerate such calculations, and since there is no additional time penalty for uploading or downloading the data, an embodiment of the present disclosure can enable a user to quickly identify horizons, surfaces and/or other structures based on visualized seismic data. Another example embodiment might set the GPU rendering mode to connect each point with a line. This can enable a viewer to identify one or more lines of faults, horizons and/or other structures without programmatically determining a seismic attribute.

An example embodiment of an algorithm for connecting each point with a line may include looking for illuminated values within a predetermined interval (e.g., illuminated values in the same interval). For example given a color value v, for one or more visualized pixels (e.g., each visualized pixels), the GPU may draw a line to the nearest point whose color is within the interval [v−e, v+e] where e is some limiting factor. This can be useful in several ways. One way to look at a color is the hue-saturation-value format v=(H, S,V). In this case an example algorithm can set "e" to match colors with similar hue values. An example algorithm may then display lines between the parts of the illuminated seismic which have the same color value, thereby highlighting the actual structure of the subsurface, using only GPU computations. Another way to look at the color would be in the standard RGB format v=(R,G,B).

An example embodiment of the present disclosure may use a light (e.g., a directional light) to highlight one or more features originating from a heightmap that has been generated from seismic data (e.g., a 2D section, including, without limitation, inline, cross-line, time-slice, random-line, poly-line, strata-slices). As an example, the seismic data may be generated from restored or flattened volumes). As an example, the artificial heightmap may be proportional to the amplitudes of the samples for a given slice.

A lighting tool may be used to view seismic data (e.g., raw seismic intersection data) in a manner that enhances a viewer's understanding of one or more geological contexts and/or patterns. For example, a user can manipulate a light having a defined orientation, color, magnitude, and/or intensity to respond to a given point on visualized seismic data (e.g., a seismic intersection). Combinations of one or more parameters using one or more lights can enhance a viewer's understanding of visualized seismic data (e.g., a seismic section).

Seismic interpretation of G&G data (e.g., interpretation of a conformable surface, erosive interpretation, salt interpretation, etc.) can be illuminated with directional lights. According to an example embodiment, each directional light may use a different color for each direction. Applying this visual aid, a map may be generated that provides an understanding of the orientation of one or more structures (e.g., a fault network). This might involve prior interpretation and an already existing understanding of the continuity of an isochronous event. That is, the light effect might be added a posteriori in order to enhance a viewer's perspective of the topography. For example, a first colored light may be directed over a bump-mapped amplitude contrast time-slice using a different orientation. Light orientation can focus the viewer's perspective and can enhance continuity for certain features. One or more directional light can be used to assist a user to focus and enhance different delineation orientations, and focus the interpretation towards a feature (e.g., a tectonic event).

According to another example embodiment, a user can use a plurality of colored lights in order to discretize a visual space. For example, by using a plurality of lights of different colors, a user may be able to visually differentiate a plurality of structures based on their shape, intensity and orientation (e.g., by pointing to the adequate azimuth and elevation). Furthermore, vertical fractures may be shown in a first color, whereas other oriented faults may be illuminated using a different colored light. This can give provide a user with an idea of orientation as well as the magnitude of deformations and/or fractures.

An example embodiment of the workflow described above can help a user obtain an understanding of different geologic sequences. For example, a seismic visualization may include an upper and lower portion. The lower portion might show heavy structures and/or faults that are clearly visible, and the dip of one or more seismic events can provide an improved understanding of a deformation process. Accordingly, using an embodiment of the present invention to interpret the fault structures in that environment can simplify seismic interpretation workflows.

Bump Mapping for Improving Low-Resolution Quality

Bump mapping can also be used to improve seismic imaging at lower resolutions. Seismic data sets can be large, and an example application that deals with large-scale seismic data might use a level-of-detail (LOD) multi-resolution scheme to cope with the data set size. This might be done, for example, if the capacity of a computer's random access memory (RAM) is not sufficient to hold all of a given set of seismic data.

Figure 4:
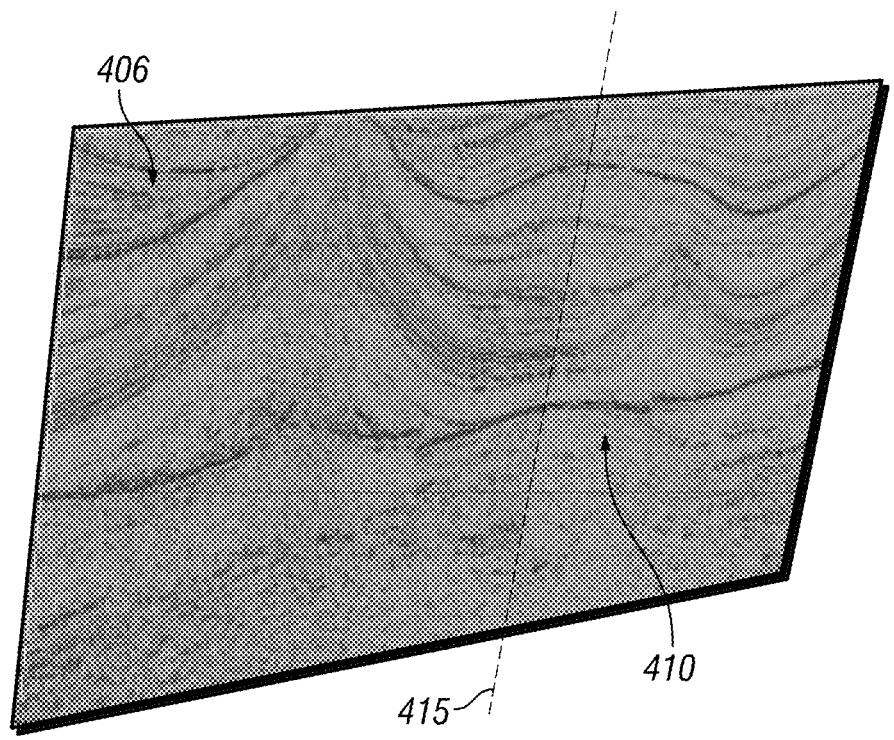
FIG. 4 illustrates an example seismic data that includes a first portion and a second portion that are rendered at different resolutions.

Although LOD schemes can provide scalability, when seismic data is visualized for a certain distance, an LOD scheme might be clearly visible to a user (e.g., due to a difference in resolution between one or more portions of the visualized seismic data). An example of this is shown in FIG. 4, which shows an example seismic intersection that includes a first portion 406 and a second portion 410 separated by a dashed line 415. The second portion 410 is rendered at a lower resolution as compared to the first portion 406, thereby producing an image that is visibly fragmented. This might happen because a seismic rendering engine, as part of an LOD scheme, might use a different level of detail in the first portion 406 versus the second portion 410. An example embodiment of the present disclosure can decrease the visual difference between the first and second portions 406 and 410 by increasing the bump mapping in the lower-resolution portion (i.e., the second portion 410). This can produce an image with less noticeable visual difference between portions that differ in resolution.

Selectively alternating the bump mapping which is applied to one or more tiles in a section can enhance the appearance of such tiles at lower resolutions. Combining this technique with multiple light colors, a user can obtain a better seismic image at lower resolutions than what may be possible without bump mapping.

An example rendering algorithm for an LOD scheme may be implemented according to the following pseudo-code:
Assuming LOD levels=[1 . . . 5] where 1 is full-resolution and 5 is the lowest resolution
For each tile t in an intersection:

Set bump mapping ratio=(1-(1/LOD-level(t)))%

Render t

The above example algorithm can produce a lower-resolution image which appears to have a higher resolution, and may reduce visual fragmentation of visualized seismic data. This technique can also be extended to use parallax and/or displacement mapping to obtain additional detail. If using a displacement map, the technique may be adapted to keep a generated mesh for the intersection in a cache and use that mesh for generating the displacements when displaying a tile with a lower LOD. Since the mesh of a LOD level is smaller in size than the actual data for that LOD level, this can produce an enhanced image.

Figure 5:
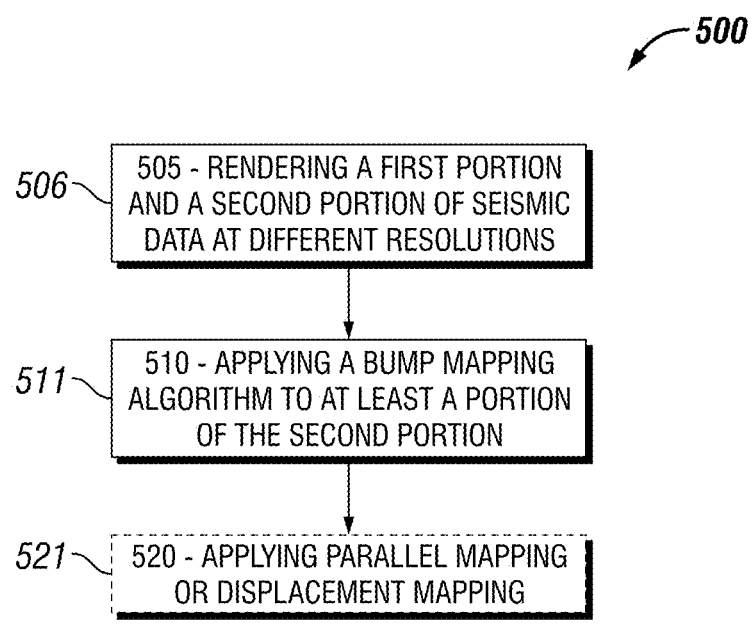
FIG. 5 illustrates an example method of rendering seismic data at a plurality of resolutions.

FIG. 5 shows an example method 500 for rendering seismic data that includes a first portion and a second portion, wherein the first and second portion are rendered at different resolutions. FIG. 5 also shows associated computer instructions 506, 511, and 521 that may be executed by a processor. Method 500 may include a block 505 that involves rendering a first portion and a second portion of seismic data at different resolutions (e.g., as part of a level-of-detail scheme). Method 500 may proceed to block 510 and/or block 520. Block 510 may include applying a bump mapping algorithm to at least a portion of the second portion. Block 520 may include applying parallel mapping or displacement mapping to at least a portion of the second portion.

Computer System

Figure 6:
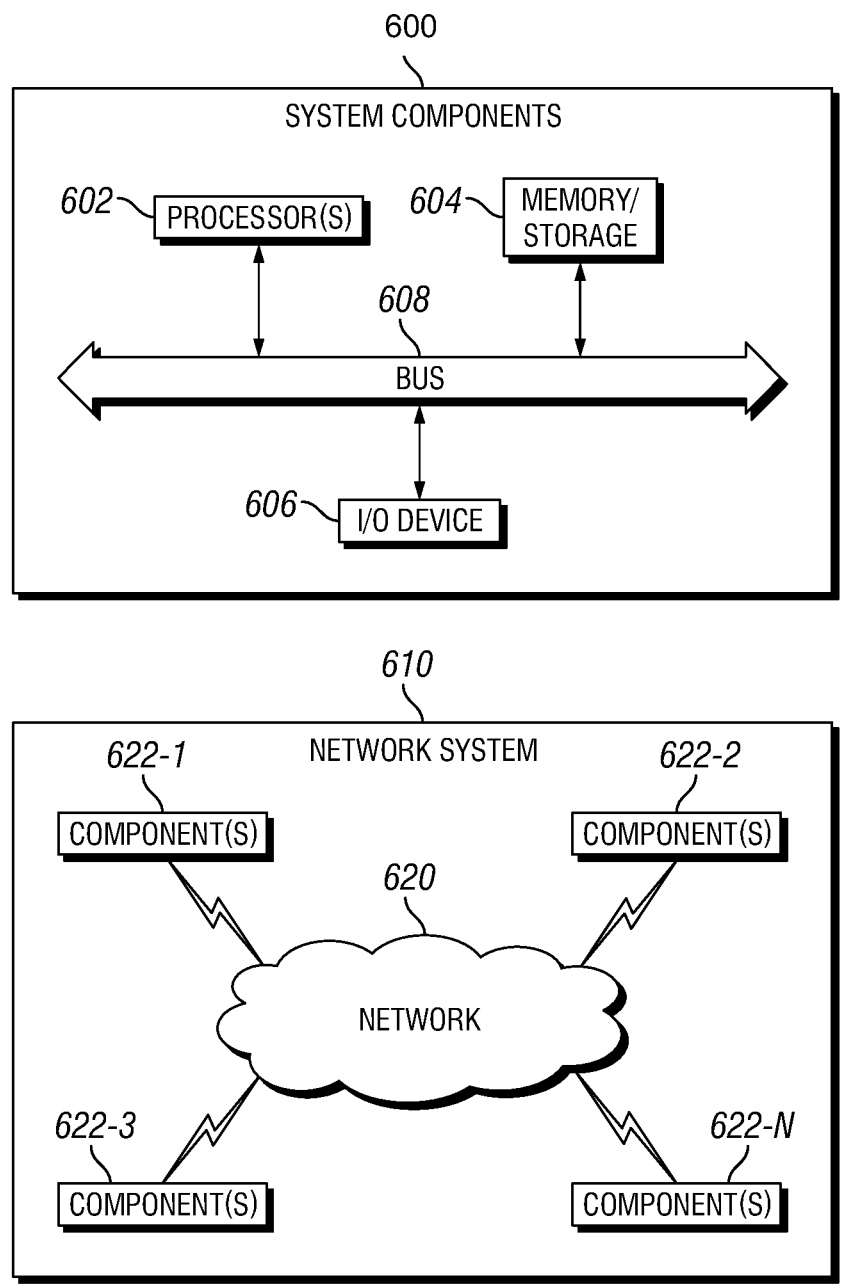
FIG. 6 illustrates an example computer system that may embody an implementation of various technologies and techniques described herein.

FIG. 6 shows components of an example of a computing system 600 and an example of a networked system 610. The system 600 includes one or more processors 602, memory and/or storage components 604, one or more input and/or output devices 606 and a bus 608. In an example embodiment, instructions may be stored in one or more computer-readable media (e.g., memory/storage components 604). Such instructions may be read by one or more processors (e.g., the processor(s) 602) via a communication bus (e.g., the bus 608), which may be wired or wireless. The one or more processors may execute such instructions to implement (wholly or in part) one or more attributes (e.g., as part of a method). A user may view output from and interact with a process via an I/O device (e.g., the device 606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 610. The network system 610 includes components 622-1, 622-2, 622-3, . . . 622-N. For example, the components 622-1 may include the processor(s) 602 while the component(s) 622-3 may include memory accessible by the processor(s) 602. Further, the component(s) 602-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method, comprising:
creating an artificial heightmap of a two-dimensional seismic slice of a geologic environment wherein the two-dimensional seismic slice comprises a vertical dimension, a lateral dimension and values based at least in part on sensed seismic data; and
rendering to a display, with illumination, a representation of at least a portion of the two-dimensional seismic slice based at least in part on computed normal vectors of the artificial heightmap wherein the illumination illuminates at least one horizon in the geologic environment that intersects the two-dimensional seismic slice.

2. The method of claim 1, further comprising filtering color values related to the artificial heightmap that are not within a predetermined color interval.

3. The method of claim 1, wherein creating the artificial heightmap comprises determining at least one of an occlusion and a parallax effect.

4. The method of claim 1, wherein creating the artificial heightmap comprises creating a mesh over at least one of an intersection or surface represented by the two-dimensional seismic slice; and adjusting a position of at least one vertex according to a value in the created artificial heightmap.

5. The method of claim 1, wherein the portion of the two-dimensional seismic slice is a first portion that is a lower resolution than a second portion of the two-dimensional seismic slice.

6. The method of claim 1, wherein the illumination directs a colored light at the representation.

7. The method of claim 6, wherein the colored light comprises a plurality of colored lights, wherein at least two of the colored lights are of different colors and illuminate the representation from different directions.

8. The method of claim 1, wherein creating the artificial heightmap comprises considering the direction of the light.

9. The method of claim 1, wherein creating the artificial heightmap comprises considering a viewing perspective.

10. One or more non-transitory computer-readable storage media comprising computer-executable instructions to instruct a computing system to:
create an artificial heightmap of a two-dimensional seismic slice of a geologic environment wherein the two-dimensional seismic slice comprises a vertical dimension, a lateral dimension and values based at least in part on sensed seismic data; and
render to a display, with illumination, a representation of at least a portion of the two-dimensional seismic slice based at least in part on computed normal vectors of the artificial heightmap wherein the illumination illuminates at least one horizon in the geologic environment that intersects the two-dimensional seismic slice.

11. The one or more non-transitory computer-readable storage media of claim 10, further comprising instructions to filter color values related to the artificial heightmap that are not within a predetermined color interval.

12. The one or more non-transitory computer-readable storage media of claim 10, wherein the instructions to create the artificial heightmap comprise instructions to determine at least one of an occlusion and a parallax effect.

13. The one or more non-transitory computer-readable storage media of claim 10, wherein the instructions to create the artificial heightmap comprise instructions to: create a mesh over at least one of an intersection or surface represented by data of the two-dimensional seismic slice; and adjust a position of at least one vertex according to a value in the created artificial heightmap.

14. The one or more non-transitory computer-readable storage media of claim 10, wherein the portion of the two-dimensional seismic slice is a first portion that is a lower resolution than a second portion of the two-dimensional seismic slice.

15. The one or more non-transitory computer-readable storage media of claim 10, wherein the instructions comprise instructions to direct a colored light at the representation.

16. The one or more non-transitory computer-readable storage media of claim 10, wherein instructions to create the artificial heightmap comprise instructions to consider the viewing perspective.

17. A system comprising:
one or more processors for processing information;
memory operatively coupled to the one or more processors; and
modules that comprise instructions stored in the memory and executable by at least one of the one or more processors, wherein the modules comprise:
a mapping module for creating an artificial heightmap of a two-dimensional seismic slice of a geologic environment wherein the two-dimensional seismic slice comprises a vertical dimension and a lateral dimension; and
a lighting module for rendering to a display, with illumination, a representation of at least a portion of the two-dimensional seismic slice based at least in part on computed normal vectors of the artificial heightmap wherein the illumination illuminates at least one horizon in the geologic environment that intersects the two-dimensional seismic slice.

18. The system of claim 17, wherein creating the artificial heightmap comprises creating a triangular mesh over at least one of an intersection or surface represented by data of the two-dimensional seismic slice; and adjusting a position of at least one vertex according to a value in the created artificial heightmap.

19. The system of claim 17, wherein the portion of the two-dimensional seismic slice is a first portion that is a lower resolution than a second portion of the two-dimensional seismic slice.

20. The system of claim 17, wherein the illumination directs a colored light at the representation.

* * * * *